United States Patent [19]

Eichberger

[11] Patent Number: 4,676,100
[45] Date of Patent: Jun. 30, 1987

[54] CAPACITANCE-TYPE MATERIAL LEVEL INDICATOR

[75] Inventor: Robert T. Eichberger, Mt. Clemens, Mich.

[73] Assignee: Berwind Corporation, Philadelphia, Pa.

[21] Appl. No.: 841,027

[22] Filed: Mar. 17, 1986

Related U.S. Application Data

[63] Continuation-in-part of Ser. No. 666,755, Oct. 31, 1984, abandoned.

[51] Int. Cl.⁴ ............... G01G 23/26; G01R 35/00
[52] U.S. Cl. .................... 73/304 C; 73/1 H; 324/61 R
[58] Field of Search .......... 73/304 C, 114; 324/130, 324/61 R

[56] References Cited

U.S. PATENT DOCUMENTS

| | | | |
|---|---|---|---|
| 1,824,745 | 9/1931 | Allen | 324/61 QL |
| 2,611,021 | 9/1952 | Perls et al. | 340/870.04 |
| 2,919,401 | 12/1959 | Cole et al. | 324/130 X |
| 3,641,544 | 2/1972 | Radin | 73/304 R |
| 3,798,431 | 3/1974 | Schulkind et al. | 324/130 X |
| 3,801,902 | 4/1974 | Horowitz | 73/304 C |
| 3,934,197 | 1/1976 | Petterson et al. | 324/130 |
| 4,147,050 | 4/1979 | Rubel et al. | 73/1 H |
| 4,208,625 | 6/1980 | Piso | 324/61 R |
| 4,314,478 | 2/1982 | Beamer | 73/304 C |
| 4,347,741 | 9/1982 | Geiger | 73/304 C |
| 4,383,444 | 5/1983 | Beamen et al. | 73/1 H X |
| 4,383,445 | 5/1983 | Siegel et al. | 73/304 C |
| 4,441,157 | 4/1984 | Gerchman et al. | 73/1 H |
| 4,499,640 | 2/1985 | Brenton et al. | 73/304 C X |
| 4,499,766 | 2/1985 | Fathauer et al. | 73/304 C |
| 4,499,767 | 2/1985 | Fathauer et al. | 73/1 H |
| 4,528,839 | 7/1985 | Blanchard et al. | 73/1 H |
| 4,555,941 | 12/1985 | Fathauer et al. | 73/304 C |

Primary Examiner—Daniel M. Yasich
Attorney, Agent, or Firm—Barnes, Kisselle, Raisch, Choate, Whittemore & Hulbert

[57] ABSTRACT

A system for indicating the level of material in a vessel as a function of material capacitance comprising a resonant circuit including a capacitance probe adapted to be disposed in a vessel so as to be responsive to variations in capacitance as a function of material level. An rf oscillator has outputs coupled to the resonant circuit and to a phase detector for detecting variations in phase angle as a function of probe capacitance. Level detection circuitry is responsive to an output of the phase detector and to a reference signal indicative of a predetermined level of material for indicating material level as a function of a difference between capacitance at the probe and the reference signal. An automatic calibration circuit adjusts the resonance characteristics of the parallel resonant circuit. A remote module provides facility for initiating a system-test and a system-calibrate operation, either individually or sequentially.

8 Claims, 3 Drawing Figures

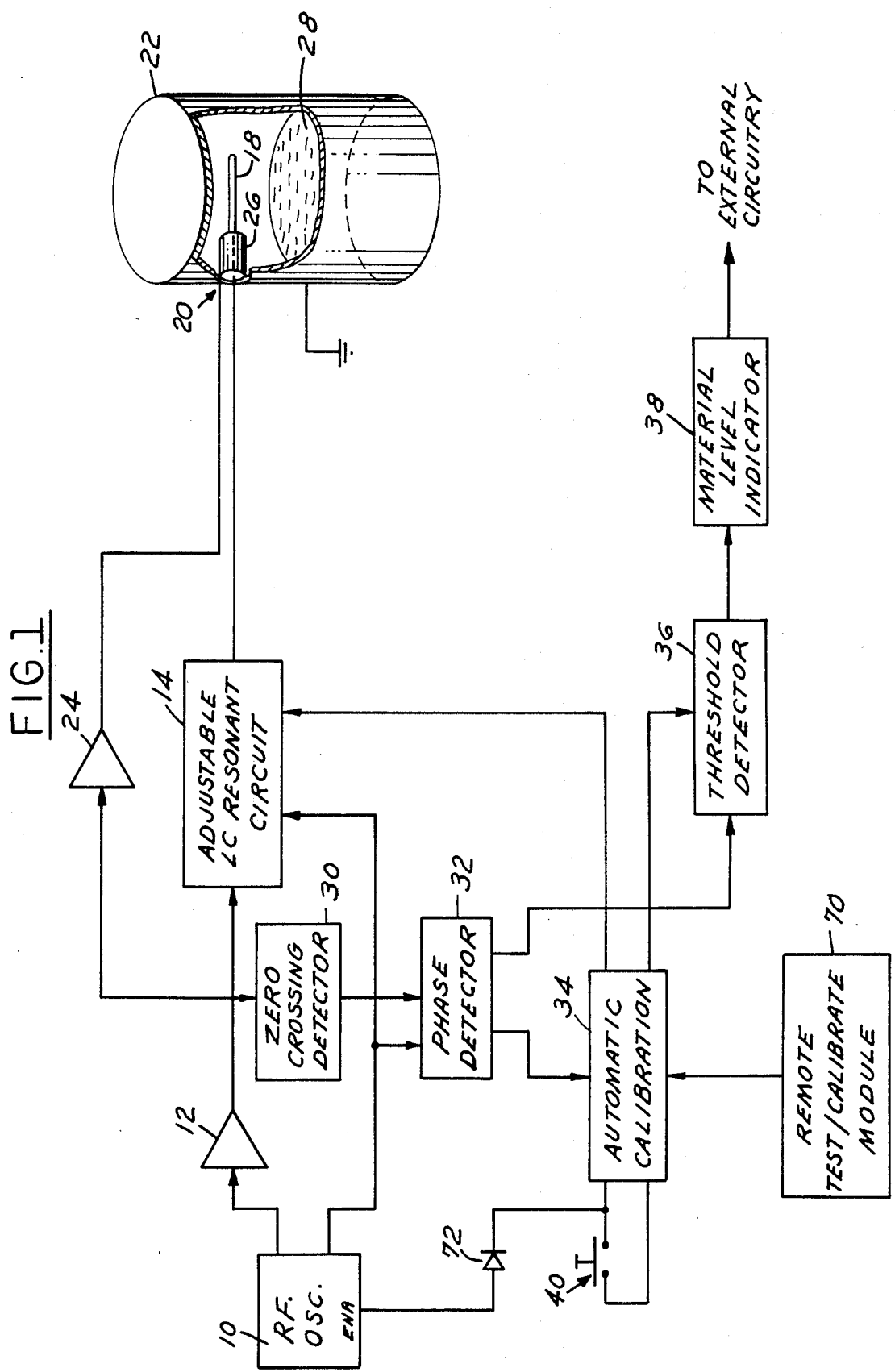

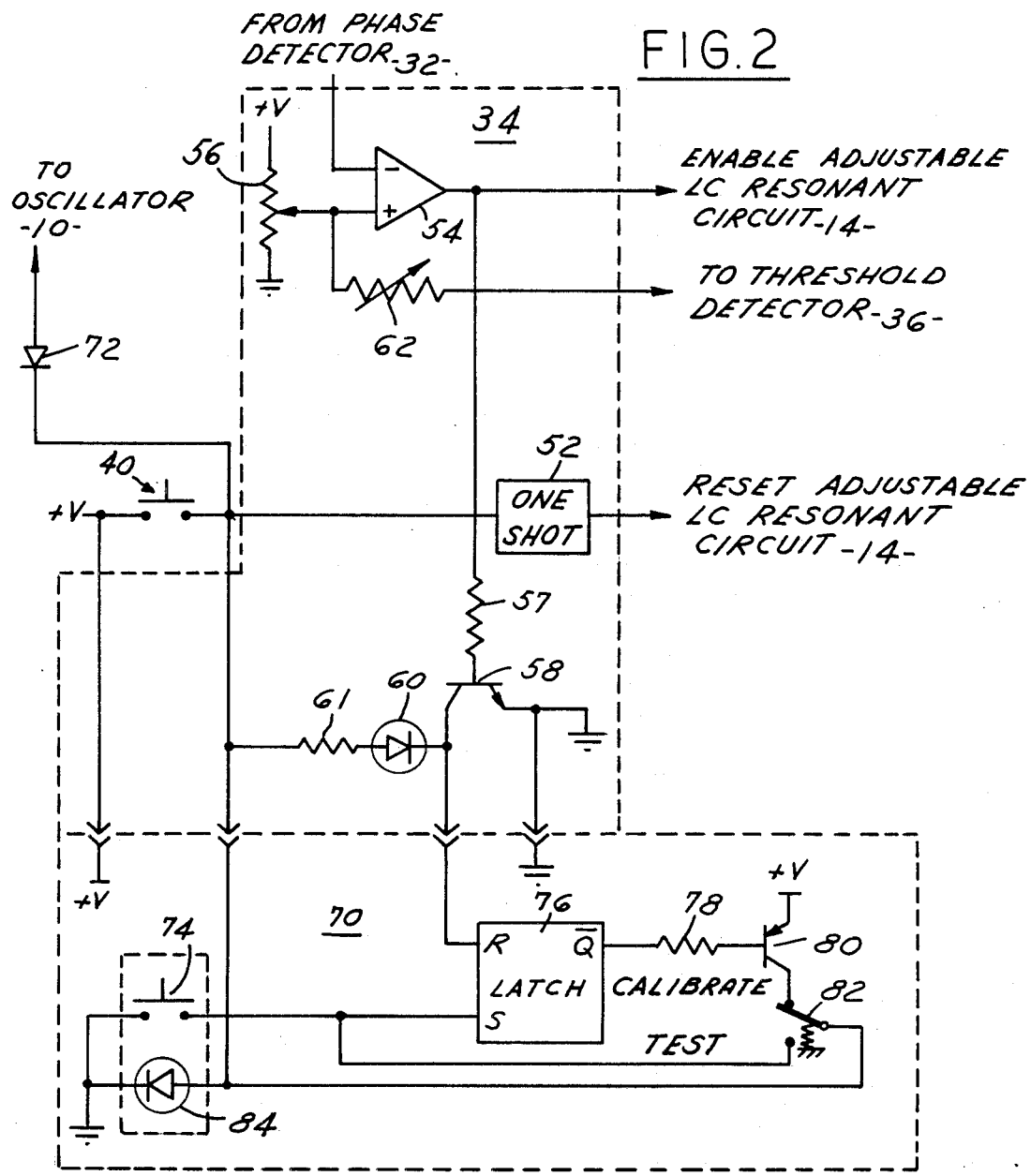

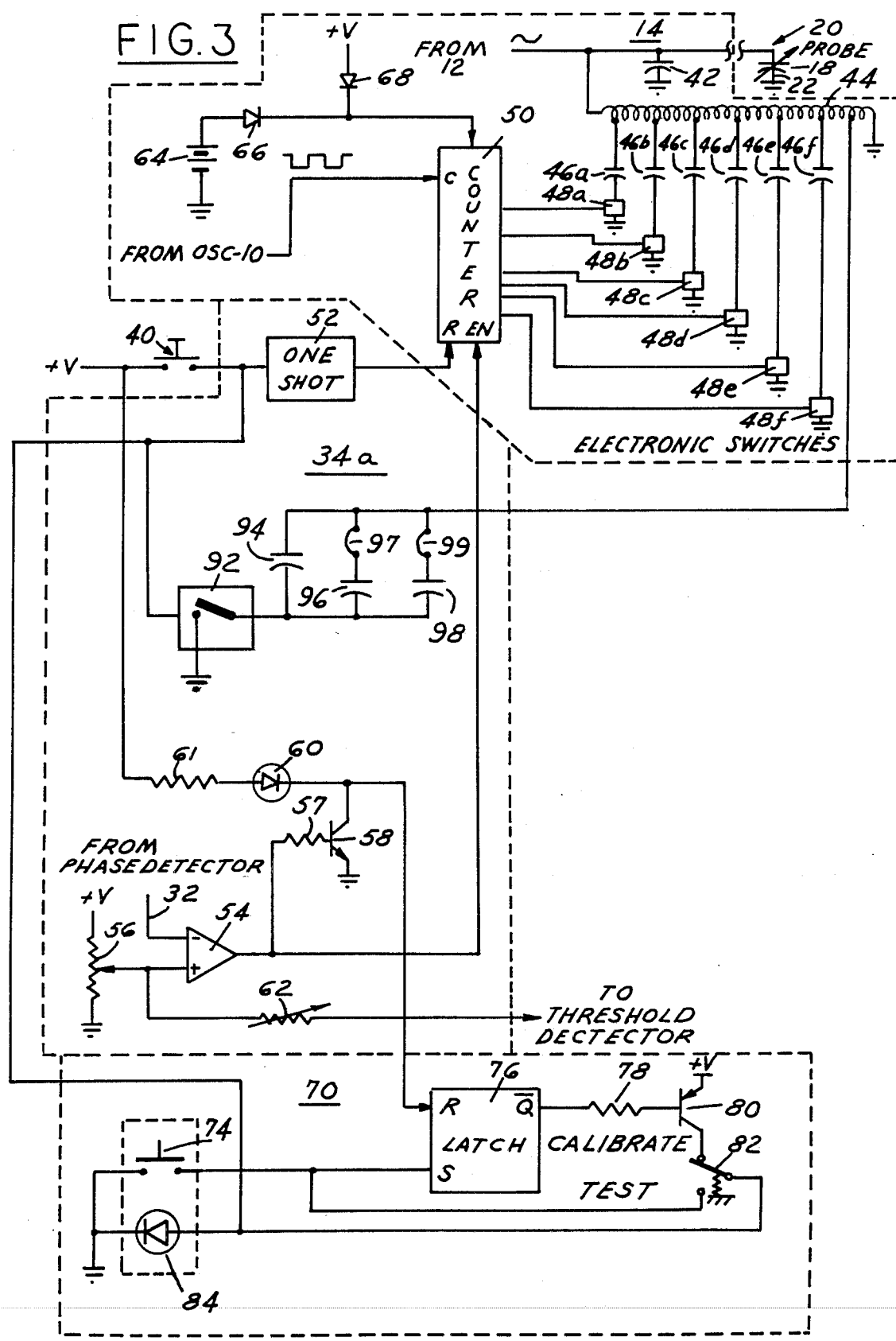

CAPACITANCE-TYPE MATERIAL LEVEL INDICATOR

This application is a continuation-in-part of application Ser. No. 666,755 filed Oct. 31, 1984 and now abandoned.

The present invention is directed to systems for indicating level of material in a storage vessel or the like, and more particularly to an improved system of the described character for indicating level of material as a function of material capacitance.

Use of capacitance-type detection techniques for sensing level of material in a storage vessel has been widely proposed and is reasonably well understood in the art. In general, calibration in the field has been a time-consuming and laborious process requiring the efforts of a skilled or semi-skilled operator. There has been a need in the art for a system embodying facility for automatic on-demand calibration which requires little or no operator intervention.

Copending U.S. application Ser. No. 411,527, filed Aug. 25, 1982, now U.S. Pat. No. 4,499,766 entitled "Capacitance-Type Material Level Indicator" and assigned to the assignee hereof, discloses a system and probe for indicating the level of material in a vessel as a function of material capacitance. The disclosed system includes a resonant circuit having a capacitance probe adapted to be disposed in a vessel so as to be responsive to variations in capacitance as a function of material level. An rf oscillator has an output coupled to the resonant circuit and to a phase detector for detecting variations in phase angle as a function of probe capacitance. Level detection circuitry is responsive to an output of the phase detector, and to a reference signal indicative of a predetermined level of material, for indicating material level as a function of a difference between capacitance at the probe and the reference signal. In the preferred embodiments disclosed in such application an automatic calibration circuit adjusts the resonance characteristics of the parallel resonant circuit or adjusts the reference signal indicative of a predetermined reference material level.

Copending U.S. application Ser. No. 652,855 filed Sept. 21, 1984 now U.S. Pat. No. 4,624,139 entitled "Capacitance-Type Material Level Indicator" and also assigned to the assignee hereof, discloses a material level indicating system which includes a bridge circuit with a capacitance material level probe in one bridge arm. An adjacent bridge arm includes a plurality of fixed capacitors coupled to controlled electronic switches for selective connection into the bridge circuit. The bridge circuit is powered by an rf oscillator, and a differential amplifier is connected across the bridge circuit for detecting balance conditions at the bridge. An automatic calibration circuit includes a digital counter having outputs connected to the electronic switches. A comparator is responsive to the differential amplifier for enabling operation of the counter during a calibration mode of operation for selectively connecting the fixed capacitors into the bridge circuit until a preselected balance condition, corresponding to a preselected reference material level, is obtained. Thereafter, the differential amplifier is responsive to variation of probe capacitance from the reference level to indicate material level.

Automatic calibration technology discussed in the preceeding paragraphs has enjoyed substantial commercial acceptance and success in the material level control market. It is an object of the present invention to provide facility for testing operation of material level indicating systems independently of level of material at the probe and with a minimum of operator intervention. More specifically, in so-called point level indicating systems which are adapted to be responsive to rise or fall of material to a preselected level in the vessel, it is an object of the present invention to provide facility for simulating effect of such material level on the indicating circuitry and thereby testing operation of the level-indicating circuitry independently of actual material level. It is a further object of the invention, in systems which include facility for automatic calibration and hereinabove described, to provide in addition facility for automatically initiating a calibration operation upon termination of a test operation on the level-indicating circuitry.

The invention, together with additional objects, features and advantages thereof, will be best understood from the following description, the appended claims and the accompanying drawings in which:

FIG. 1 is a functional block diagram of a embodiment of a capacitance-type material level indicating system in accordance with the invention; and FIG. 2 is a fragmentary electrical schematic diagram of a portion of the system illustrated in FIG. 1 showing details of a embodiment of the automatic test and calibration circuitry of the invention.

FIG. 3 is a fragmentary electrical schematic diagram which illustrates a modified, presently preferred embodiment of the invention.

The disclosure of above-mentioned copending application Ser. No. 411,527 and now U.S. Pat. No. 4,499,766 is incorporated herein by reference.

FIG. 1 illustrates an embodiment of a material level indicating system in accordance with the invention as comprising an rf oscillator 10 which provides a periodic signal at a first output to a phase shift (ninety degrees) amplifier 12. The sinusoidal output of amplifier 12 is connected to an adjustable parallel LC resonant circuit 14. Resonant circuit 14 is connected to the probe conductor 18 of a probe assembly 20 (FIG. 1) mounted in the side wall of a storage vessel 22. The output of amplifier 12 is also connected through a unity-gain amplifier 24 having low output inpedance to the guard shield 26 of probe assembly 20. The wall of vessel 22, which may be a storage bin for solid materials or a liquid storage tank, is connected to ground. As is well-known in the art, the capacitance between probe conductor 18 and the grounded wall of vessel 22 varies with the level of the material 28 stored therein and with material dielectric constant. This variation in capacitance is sensed by the remainder of the system electronics to be described to provide the desired indication of material level. Guard shield 26, which is energized by amplifier 24 at substantially the same voltage and phase as probe conductor 18, functions to prevent leakage of probe energy through material coated onto the probe surface, and thus to direct probe radiation outwardly into the vessel volume so as to be more closely responsive to the level of material stored therein. A presently preferred embodiment of probe assembly 20 is described in U.S. application Ser. No. 419,776 filed Sept. 20, 1982 and assigned to the assignee hereof now U.S. Pat. No. 4,499,641.

The sinusoidal output of amplifier 12 is fed through a zero crossing detector 30 to one input of a phase detector 32. Phase detector 32 receives a square-wave second input from a second output of oscillator 10 one hundred eighty degrees out of phase with the oscillator output directed to amplifier 12. A first output of phase detector 32, which is a d.c. signal at a level proportional to the phase relationship between the respective inputs, and thus responsive to variations in phase angle of the oscillator probe drive output due to changes in probe capacitance, is fed to an automatic calibration circuit 34. A second output of phase detector 32, which is also a d.c. signal indicative of input phase relationship, is directed to one input of a threshold detector 36. The outputs of phase detector 32 are identical but effectively isolated from each other. Automatic calibration circuit 34 provides a control input to adjustable LC resonant circuit 14, which receives a second input for adjustment purposes from oscillator 10. Calibration circuit 34 also provides a reference input to threshold detector 36. The output of threshold detector 36 is fed through material level indicating circuitry 38 to external circuitry for controlling and/or indicating vessel material level as desired.

In general, automatic calibration circuitry 34 functions to adjust the resonance characteristics of resonant circuit 14 during a calibration mode of operation initiated by an operator push-button 40 connected thereto so as to establish, in effect, a reference capacitance level indicative of a preselected material condition in vessel 22 which exists during the automatic calibration mode. Preferably, the level of material in vessel 22 is first raised (by means not shown) to the level of probe assembly 20 and then lowered so as to be spaced from the probe assembly. If material 28 is of a type which coats the probe assembly, such coating will remain on the probe and be taken into consideration during the ensuing calibration operation. With the material level lowered, an operator may push button 40 to initiate the automatic calibration mode of operation. The resonance characteristics of circiut 14 are then automatically varied or adjusted by calibration circuit 34 in a preselected or preprogrammed manner until the output of phase detector 32 indicates that the return signal from the parallel combination of resonant circuit 14 and capacitance probe 18 bear a preselected phase relationship to the oscillator reference input to phase detector 32, which phase relationship thus corresponds to an effective reference capacitance level at calibration circuit 34 indicative of a low material level.

Thereafter, during the normal operating mode, the output of phase detector 32 is compared in threshold detector 36 to a reference input from calibration circuit 34 indicative of the reference capacitance. level, and threshold detector 34 provides an output to material level indicating circuitry 38 when the sensed material capacitance exceeds the reference capacitance level by a predetermined amount which is selected as a function of material dielectric constant. If probe assembly 20 is placed in the upper portion of vessel 22 as shown in FIG. 1, such proximity would normally indicate a full tank or high-level condition. If, on the other hand, probe assembly 20 is disposed in the lower portion of tank 22, material would normally be in proximity to the probe assembly, and indeed would normally cover the probe assembly, so that absence of such proximity would indicate an empty tank or low-level condition.

Automatic calibration circuit 34 illustrated in FIG. 2 includes a one-shot 52 which receives an input from operator pushbutton 40 and provides an output to reset resonant circuit 14 (FIG. 1) to initiate the automatic calibration mode of operation. A differential comparator 54 has an inverting input connected to the output of phase detector 32 and a non-inverting input connected to the wiper of a variable resistor 56. Resistor 56 is connected across a source d.c. potential. The output of comparator 54 is connected to enable variation of resonant circuit 14 (FIG. 1). The output of comparator 54 is also connected through a resistor 57 to the base of an NPN transistor 58 which functions as an electronic switch having primary collector and emitter electrodes connected in series with an LED 60, a resistor 61 and operator switch 40 across a source of d.c. potential. The non-inverting input of comparator 54 is also connected through an adjustable resistor 62 to threshold detector 36 (FIG. 1).

Depression of switch 40 by an operator initiates the automatic calibration procedure by clearing or resetting resonate circuit 14. With material coated on the probe, circuit operation is substantially removed from resonance, and the output from phase detector 32 (FIG. 1) to comparator 54 (FIG. 2) is high. Differential comparator 54 thus provides a low output to enable resonant circuit 14 and to the base of transistor 58, so that transistor 58 is biased for non-conduction and de-energizes LED 60. With resonant circuit 14 so reset and enabled, capacitive impedance is progressively added to the resonant circuit, and circuit operation approaches resonance at the frequency of oscillator 10. Simultaneously the output of phase detector 32 decreases toward the reference level determined by the setting of variable resistor 56 at the non-inverting input of differential comparator 54. Resistor 56 is preferably factory set to correspond with a resonance condition at circuit 14 for a low-level or "empty-vessel" nominal capacitance with no coating on probe assembly 20. The empty-tank capacitance at probe assembly 20 may be fifteen picofarads, for example. When the output of phase detector 32 reaches this reference capacitance level input to comparator 54, which is preferably at substantially the resonance condition of the LC resonant circuit, the output of differential amplifier 54 switches to a high or one logic stage. Further operation of resonant circuit 14 is inhibited and LED 60 is illuminated through transistor 58 so as to indicate to an operator that the calibration operation has been completed. The operator may then release switch 40.

All of the circuitry hereinabove (and hereinafter) described receive input power from a suitable power supply (not shown) energized by a utility power source. To the extent thus far described, the circuitry of FIGS. 1 and 2 is similar to that disclosed in FIGS. 1 and 2 of above-noted U.S. application Ser. No. 411,527, with identical reference numerals being employed to facilitate cross reference.

In accordance with the present invention, a remote test/calibrate module 70 is connected to automatic calibration circuit 34 and a diode 72 is connected between switch 40 and oscillator 10 for selectively testing and/or initiating calibration of the level-indicating circuitry. Referring to FIG. 2, remote test/calibrate module 70 includes an operator pushbutton switch 74 having normally open contacts respectively connected to ground and to the set input of a latch 76. The reset input of latch 76 is connected with calibration circuit 34 at the juncture of diode 60 and transistor 58. The $\bar{Q}$ output of latch 76 is connected through a resistor 78 to the base of a PNP transistor 80 which has its emitter connected to the positive supply voltage fed to remote module 70 from calibration circuit 34. That is, module 70 is powered by the power supply of the material level indicating circuitry. A momentary contact calibrate/test switch 82 has its normally closed contact connected to the collector of transistor 80, its normally open contact connected to the set input of latch 76 and its common contact connected through an LED 84 to ground. The common contact of switch 82 is also connected in automatic calibration circuit 34 to the juncture of switch 40 and resistor 61. Diode 72 has its cathode likewise connected to such junction and its anode connected to the enable input of oscillator 10 so as to inhibit oscillator operation when the cathode of diode 72 is grounded.

In operation, to initiate a calibration operation remotely of the material level indicating circuitry using module 70, switch 82 is left in its normal position illustrated in FIG. 2 and pushbutton 74 is depressed. Latch 76 is set so as to turn on transistor 80 and thereby connect the positive voltage supply through switch 82 to one-shot 52 and resistor 61. At the same time, LED 84 is illuminated to indicate to the operator that a calibration operation is taking place. Resonant circuit 14 (FIG. 1) is reset and enabled, and the calibration operation proceeds as previsouly described. When calibration is completed and the output of comparator 54 does high, transistor 58 is turned on and latch 76 is reset so as to extinguish LED 84 and terminate the calibration operation. Thus, with calibrate/test switch 82 in its normal or calibrate position illustrated in FIG. 2, depression of pushbutton 74 functions in the same manner as does depression of switch 40 to initiate a calibration operation. It will be noted that diode 72 does not affect operation of oscillator 10 because the cathode thereof is either reverse biased by transistor 80 or is effectively open.

To initiate a test operation, momentary switch 82 is first depressed to its normally open position so that the common contact thereof is connected to the normally thus directly connected to switch 74. When switch 74 is then depressed, the cathode of diode 72 is effectively grounded through switch 82 and switch 74. Operation of oscillator 10 is thereby disenabled through diode 72. Absence of rf inputs to phase detector 32 functions as an out-of-phase condition, and thus simulates rise of material 28 in vessel 22 to the level-detecting point of probe assembly 20. If phase detector 32, threshold detector 36 and material level indicator 38 are operating properly, a high material level condition is indicated to the external circuitry, and thus may be observed by the operator as a successful system test. On the other hand, absence of a high material level signal indicates system failure, calling for repair or replacement.

In accordance with a further feature of the invention, following completion of a successful system test as previously described, the operator may release momentary-contact calibrate/test switch 82, so that the switch assumes its normal position shown in FIG. 2, while continuing to depress pushbutton switch 74. A calibration operation is thereby automatically initiated. Thus, it is preferred in conducting a system test operation to have material 28 at the low-level position normally used during the calibration operation as previously described, and to initiate a calibration operation upon successful completion of a system test operation.

It will be appreciated that the principles of the

FIG. 3 illustrates a modified automatic calibration circuit 34a in combination with remote test/calibrate circuit 70 in accordance with the invention. FIG. 3 also illustrates adjustable LC resonant circuit 14 disclosed in above-referenced U.S. Pat. No. 4,499,766 as comprising an autotransformer 44 connected in parallel with probe 20. A counter 50 receives a count input from oscillator 10, a reset input from one-shot 52 and an enable input from comparator 54. The digital outputs of counter 50 control electronic switches 48a–48f which selectively connect capacitors 46a–46f in circuit with autotransformer 44 and orobe 20. Operation of circuit 14 is summarized hereinabove, and is described in greater detail in referenced U.S. Pat. No. 4,499,766.

In modified calibration circuit 34a, the common contact of switch 82 is connected to the control input of an electronic switch 92, rather than to oscillator 10 through diode 72 as in FIGS. 1 and 2. Switch 92 may comprise an extra switch in a package which includes switches 48a–48f. A capacitor 94 is connected in series with the conducting terminals of switch 92 between ground and a tap on autotransformer 44. A pair of capacitors 96,98 are connected by corresponding jumpers 97,99 in parallel with capacitor 94.

In operation, closure of switch 82 to the "test" position activates switch 92, thereby adding capacitors 96,98 and/or 94 to the parallel resonant circuit which includes probe 20, autotransformer 44 and capacitors 42, 46a–46f as the latter are connected in circuit by the prior calibration operation. The additional capacitance represented by capacitors 96,98 and/or 94 simulates presence of material adjacent to probe 20 independently of actual material level. That is, capacitors 96,98 and/or 94 add at least as much capacitance to the resonant circuit as does material adjacent to probe 20, so that threshold detector 36 and material level indicator 38 indicate a "high" level of material adjacent to (or covering) probe 20 regardless of actual material height.

Thus, jumpers 97,99 are removed or left in place as a function of material with which the system is to be employed. For high dielectric materials, both jumpers are left intact, so that closure of switch 92 adds all three capacitors 94,96,98 to circuit 14, with the effective capacitance being multiplied by autotransformer 44. For low dielectric materials, both jumpers 97,99 are removed. For intermediate materials, one or the other jumper 97 or 99 is removed. Note another modification to automatic calibration circuit 34a whereby resistor 61 is connected directly to the voltage supply rather than through switch 40. Thus, LED 60 will remain lit following the test/calibration operation without requiring continued depression of switch 40.

It will be appreciated that the principles of the invention hereinabove discussed in connection with the preferred embodiment of the drawings may be implemented equally as well in other embodiments. For example, the remote test module 70 and diode 72 may be implemented without substantial modification in the bridge-type circuits with automatic calibration feature disclosed in referenced application Serial No. 652,855. It is also envisioned that either or both of the switches 74, 82 may be replaced by suitable electronic switches selectively controlled by a central system.

Thus, the preferred embodiments of the invention comprise a system for indicating level of material in a vessel as a function of material capacitance and include a probe 20 adapted to be coupled to the vessel 22 so as to exhibit variations in capacitance as a function of level of material 28 in the vessel. Circuitry, which includes rf oscillator 10, adjustable LC resonant circuit 14 and phase detector 30, is coupled to the probe and exhibits variations in operating characteristics—i.e., resonance characteristics of LC resonant circuit 14 and phase angle relationship detected at the inputs of phase detector 32—as a function of capacitance at probe 20, and thus as a function of material level. A threshold detector 36 is responsive to such variations in operating characteristics, as indicated at the output of phase detector 32, for indicating a first point level condition of material 28 in vessel 22 adjacent to probe 20 when effective probe capacitance reaches a preselected level greater than empty-tank capacitance. This preselected level corresponds to the threshold of detector 36. The preferred embodiments of the invention also include an automatic calibration circuit 34 coupled to adjustable LC resonant circuit 14 and responsive to closure of a calibration switch 40 for automatically calibrating resonant circuit 14 at a level corresponding to an empty vessel condition. The threshold set by detector 36 thus corresponds to an increase in capacitance at probe 20 when the level of material 28 increases from the empty vessel condition to the point of detection adjacent to probe 20. The preferred embodiments of the invention thus embody the subject matter disclosed in U.S. Pat. No. 4,499,766 referenced in the introductory portion of the application text.

In accordance with the present invention, a remote test feature seeks to test system operation—i.e., indicating rise of material 28 to a position adjacent to probe 20—by effectively simulating such material level to the circuit electronics—i.e., to oscillator 10, adjustable LC resonant circuit 14 and phase detector 32—independently of actual material level at the probe. In the embodiment of FIG. 2, closure of switches 74, 82 within test module 70 functions to disable operation of oscillator 10 by grounding the oscillator enable input through diode 72. Absence of oscillator signal inputs to phase detector 32 presents an out-of-phase condition, and thus simulates rise of material 28 in vessel 22 to the level-detecting point of threshold detector 36. In the embodiment of FIG. 3, operation of switches 74, 82 within module 70 likewise simulates rise of material 28 in vessel 22 to the level-detecting point of threshold detector 36, not by disabling operation of oscillator 10, but by closing electronic switch 92 and thereby adding capacitors 98, 96 and/or 94 in parallel with the probe. If phase detector 32, threshold detector 36 and material level indicator 38 are operating properly, a high-level material indication is presented to the "external circuitry" regardless of actual material level. On the other hand, absence of such high-level signal during a test operation indicates system failure, calling for repair or replacement.

Finally, in the preferred embodiments of the invention, and following completion of a test operation as previously described, circuitry automatically initiates a calibration operation for adjusting detection circuit operating characteristcs—i.e., resonance characteristics of adjustable LC resonant circuit 14—to the empty-vessel level. Thus, release of spring-loaded switch 82 following a test operation automatically initiates a calibration operation through one-shot 52, whereupon resonant characteristics of circuit 14 are varied until the output of phase detector 32 corresponds to the calibration level set at resistor 56. Thereafter, as previously noted, threshold detector 36, which is connected to empty-vessel calibration resistor 56 through a resistor 62, is responsive to increase of capacitance at the vessel above the empty-vessel level for indicating material level.

The invention claimed is:

1. A system for indicating point level of material in a vessel as a function of material capacitance comprising probe means adapted to be coupled to a vessel so as to be responsive to variations in capacitance as a function of material level in the vessel; circuit means including rf oscillator means and resonant circuit means coupled to said probe means, and phase detection means responsive to variations in phase angle at said oscillator means and said resonant circuit means as a function of capacitance at said probe means; means responsive to said phase detection means for indicating a first point level condition of material in the vessel adjacent to said probe when capacitance at said probe means reaches a preselected level greater than empty-vessel capacitance at said probe means and output of said phase detection means obtains a corresponding first predetermined output characteristic; and test means for testing operation of said circuit means and said indicating means to indicate said first point level condition, said test means including means for selectively initiating a test operation, and means coupled to said circuit means and responsive to said initiating means for selectively varying output of said phase detection means to said first predetermined output characteristic, and thereby simulating said first point level condition at said indicating means, independently of actual level of material at said probe means.

2. The system set forth in claim 1 wherein said test means includes means responsive to said initiating means for inhibiting operation of said oscillator means.

3. The system set forth in claim 1 further comprising calibration means including means for automatically varying operating characteristics of said circuit means including said phase detection means independently of said probe means to a second output characteristic of said phase detection means corresponding to an empty-vessel level of material in the vessel, said indicating means being responsive to variations in capacitance at said probe means and consequent variations in said output characteristic from said second characteristic to said first characteristic for indicating said first point level condition of material in said vessel.

4. The system set forth in claim 3 wherein said test circuit means includes means coupled to said calibration means and responsive to said test initiating means for automatically initiating a calibration operation following termination of a said test operation.

5. The system set forth in claim 1 wherein said means coupled to said circuit means comprises capacitance means and switch means responsive to said selectively-initiating means for operatively connecting said capacitance means in parallel with said probe means, said capacitance means being such as to add at least as much capacitance in parallel with said probe means as would be added at said probe means by material adjacent to said probe means at said first point level condition.

6. The system set forth in claim 5 wherein said resonant circuit means includes an autotransformer connected in parallel with said probe means, and wherein said capacitance means includes at least one capacitor selectively connected to said autotransformer in parallel with said probe means.

7. The system set forth in claim 6 wherein said capacitance means includes a plurality of capacitors selectively connected in parallel with each other to said autotransformer.

8. A system indicating level of material in a vessel as a function of material capacitance comprising probe means adapted to be coupled to a vessel so as to be responsive to variations in capacitance as a function of material level in the vessel; circuit means coupled to said probe means such that operating characteristics of said circuit means vary as a function of capacitance at said probe means; calibration means including means for initiating a calibration operation, means coupled to said circuit means and responsive to said calibration-initiating means for automatically varying operating characteristics of said circuit means independently of said probe means in a predetermined manner during a said calibration operation, and means responsive to said circuit means during a said calibration operation for detecting a first predetermined operating characteristic of said circuit means, corresponding to a first preselected material level condition in said vessel, and for terminating said calibration operation when said predetermined operating characteristic is obtained; means responsive to variations in operating characteristics of said circuit means including said probe means from said first predetermined operating characteristic for indicating when material in said vessel reaches a second preselected material level condition in said vessel different from said first preselected material level condition; and test means including means for selectively initiating a test operation, means coupled to said circuit means and responsive to said test-initiating means for varying operating characteristics at said circuit means independently of said probe means and said calibration means to a second operating characteristic, said indicating means being responsive to said second operating characteristic at said circuit means to indicate said second preselected material level condition at said vessel independently of said probe means, said test-initiating-responsive means thereby simulating said second preselected material level condition at said circuit means independently of said probe means, and means coupled to said calibration means for automatically initiating a said calibration operation following termination of a said test operation.

* * * * *